Oct. 3, 1939.　　　P. DUNSHEATH　　　2,174,918
APPARATUS FOR FEEDING INGOTS INTO MELTING FURNACES
Filed July 7, 1937　　　8 Sheets-Sheet 1

Fig. 1

INVENTOR:-
PERCY DUNSHEATH
BY
Stebbins, Blenko & Parmelee
ATTORNEYS

Oct. 3, 1939.   P. DUNSHEATH   2,174,918
APPARATUS FOR FEEDING INGOTS INTO MELTING FURNACES
Filed July 7, 1937   8 Sheets-Sheet 5

INVENTOR:-
PERCY DUNSHEATH
BY
ATTORNEYS

Fig. 6.

Patented Oct. 3, 1939

2,174,918

UNITED STATES PATENT OFFICE 2,174,918

APPARATUS FOR FEEDING INGOTS INTO MELTING FURNACES

Percy Dunsheath, Sidcup, Kent, England, assignor to Henley Extrusion Machine Company Limited, London, England, a British company Application July 7, 1937, Serial No. 152,313
In Great Britain July 18, 1936

13 Claims. (Cl. 214—18)

This invention is concerned with arrangements for feeding a metal melting furnace with pigs or ingots, that is bodies of solid metal that are of regular form and dimensions and are generally materially longer in one direction than in the others. It is generally advantageous to introduce ingots singly into the furnace, at frequent intervals, and so avoid excessive cooling of the molten metal in the furnace. It is an object of this invention to provide an improved form of apparatus for doing this automatically either at a predetermined rate or at a rate controlled by the rate of melting or by the level of molten metal in the furnace.

According to our invention the improved ingot feeding apparatus comprises an ingot magazine capable of holding a large number of ingots (for instance, twenty). The magazine is in the form of a drum, preferably of conical shape, which is rotatable about its axis which is disposed vertically. The ingots are positioned on carriers disposed uniformly around the periphery of the drum and the magazine is rotated step by step to bring the ingots successively into a position in which they can be released from the magazine and transferred automatically to the furnace. The rate of rotation of the magazine and the rate of release of ingots can be predetermined or controlled by the level of molten metal in the furnace or by the rate of melting or, alternatively, the operation may be remotely controlled by the furnace operator.

The magazine may discharge ingots directly into the furnace or directly into a sealing chamber forming a part thereof, in which cases it will generally be necessary to mount the magazine above the charging aperture of the furnace. In many cases, however, it will be preferable to arrange for the magazine to discharge ingots on to an elevator which raises them to the charging aperture and then transfers them into the furnace or feed chamber, as the case may be. In this case the movement of the magazine and that of the elevator will be co-ordinated. This may be done by arranging for the one to be driven by the other. Preferably, the elevator is driven at a predetermined speed or at a speed controlled by the level of the molten metal or by the rate of melting and the magazine is driven by the elevator at a corresponding speed.

The improved form of automatic feed apparatus is particularly, though by no means exclusively, suitable for use in conjunction with an inclined tubular melting furnace of the kind in which the ingots to be melted are introduced endwise into the furnace through a door in the upper end thereof, and the invention will be more fully described with reference to the accompanying drawings which show, by way of example only, a form of automatic feed apparatus constructed in accordance with the invention and expressly designed for use with such a furnace. During the course of the description various modifications that may be made are pointed out and it will be appreciated that these and other changes may be made without departing from the invention as defined in the appended claims.

In the drawings, Figures 1 and 1a taken together represent an elevation showing the general arrangement of the melting furnace and its automatic feed apparatus which comprises an ingot magazine and an elevator, Figures 2 and 2a taken together represent a view, on an enlarged scale and partly in elevation and partly in section on the line II—II of Figure 4, of one side of the magazine and lower end of the elevator, all but two of the carriers being omitted for the sake of clearness.

Figure 4:
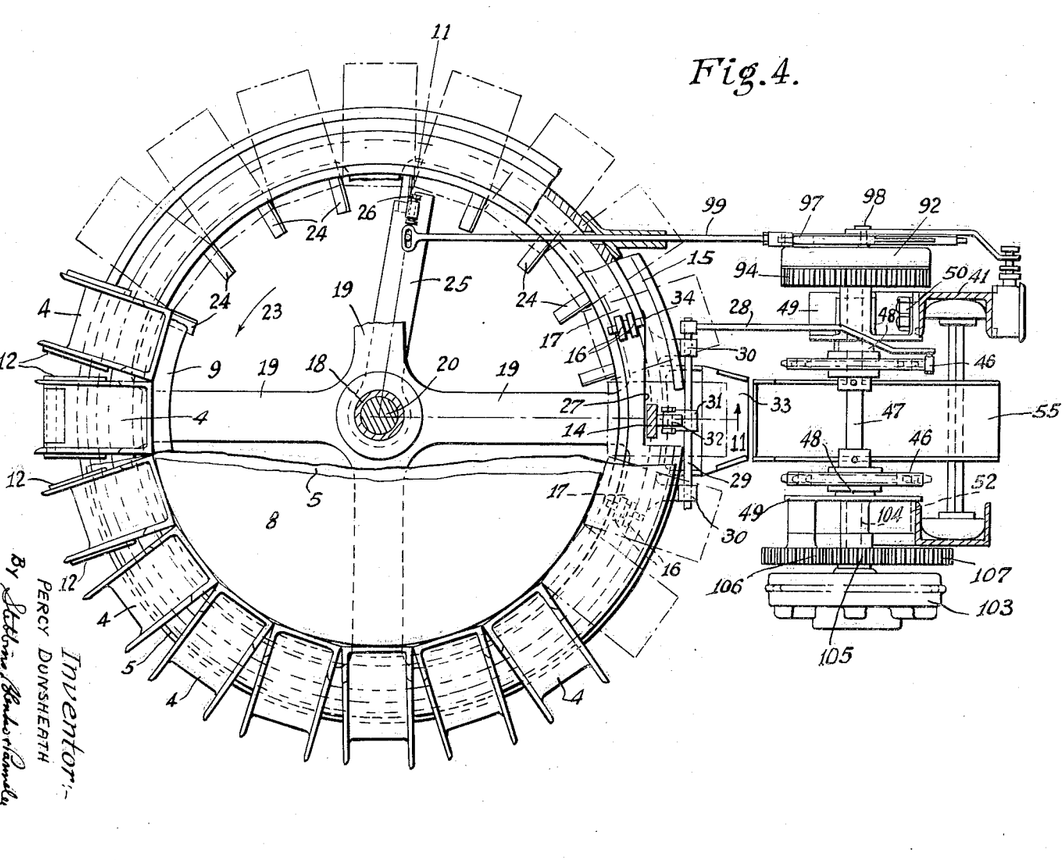
Figure 4 is a plan view, partly in section, of a part of the magazine and the lower end of the elevator.

The magazine 1 shown in the drawings comprises a conical drum 2 supported on a cylindrical frame 3 so as to be rotatable about its vertically disposed axis. The drum comprises upper and lower end plates held together in spaced relationship by a number of channel members 4 arranged side by side around the peripheries thereof, each with its base facing inwardly and its sides extending more or less radially outwards. The lower end plate of the drum comprises a disc 5 provided on its upper surface with a hub 6 and on its under side a rim in the front of a flat ring 7. The upper end plate comprises a disc 8 having an angle iron rim 9. Each channel member 4 is secured at its upper end to the dependent flange of the rim 9 and at its lower end to a bracket 10 formed integrally with or welded to the rim 7 of the lower end plate. The diameter of the upper end plate is less than that of the lower so that the channel members make an angle of about 20° or 30° with the axis of the magazine. Each channel member 4 forms a carrier for an ingot 11 which is normally retained therein by a stirrup 12 that is pivotally supported on studs 13 projecting from the side walls of the channel and engages the lower end of the ingot. Normally the stirrup is retained in position by an extension piece 14 which runs in a guide channel 15 extending round the greater part of the peripheral wall of the frame 3. The drum is rotatably supported by the rim 7 which rests on a series of rollers 16 housed in an annular groove 17 in the upper surface of the frame 3. Concentric with the axis of the frame and drum and rotatably positioned in bearings 18 carried on arms 19 extending inwards from the cylindrical wall of the former, is a vertical driving shaft 20. The upper end of this shaft enters the hub 6 of the lower end plate of the drum, to which it is anchored against endwise movement by the nut 21 and against relative rotation by a key 22. Mounted, in a similar manner, on the lower end of the shaft 20 is a ratchet wheel 23 in the form of a disc, around the peripheral edge of the upper surface of which are disposed a number of radially extending upstanding ribs 24 formed by short lengths of angle iron. These ribs constitute the teeth of the ratchet wheel and correspond numerically to the number of ingot carriers 4 provided on the drum, i. e. twenty in the example shown in the drawings. Rotation of the drum is effected by means of a reciprocating arm 25 pivotally supported on the shaft 20 and carrying a pawl 26 which, during each movement of the arm to the left as seen in Figure 4, engages a rib 24 on the disc and pushes it forward by an amount sufficient to rotate the drum through an angle equal 1/$n$th of a complete revolution, where $n$ is equal to the number of ingot carriers 4 provided on the drum. In the example shown twenty carriers are provided and the angle rotated during each effective stroke of the pawl arm is 18°. During each reverse stroke of the arm 25 the pawl 26 slips over a rib so that the magazine is not rotated in the reverse direction. It will be appreciated that this pawl arm may be actuated, as required, in any convenient manner.

At the point where it is desired to release ingots from the drum, the guide channel 15 departs from its normal circular path and approaches the centre of the drum to form a recess 27 which permits the stirrup of the carrier at that point to be swung inwardly to an extent sufficient to clear the lower edge of the ingot therein. This movement of the stirrup on the carrier at the release point may be effected by suitably shaping the outer wall of the guide channel 15 so that the member 14 is forced inwardly as the carrier reaches the release point but the outer wall of the channel 15 is preferably cut away at the release point and the stirrup forced inwards by means of a lever 28 secured on one end of a horizontal spindle 29 rotatably supported in bearings 30 on the frame 3 and carrying a second lever 31 of which the upper end carries a roller 32 bearing against the member 14 on the stirrup of the carrier in the releasing position. Raising the lever 28 either by hand, or automatically in the manner to be described subsequently, causes the stirrup to swing inwards into the recess 27 in the wall of the frame so as to release the ingot. On being released, the ingot slides from its carrier over a stationary channel shaped guide 33 mounted on the wall of the frame 3 and on to the elevator or, in cases where no elevator is required, directly into the charging aperture of the furnace. Beyond the release point the inner face of the channel 15 gradually recedes from the centre of the drum so forming a cam shaped surface 34 whereby the stirrup of the empty carrier is returned to its initial position as the carrier moves on from the releasing position.

Figure 6:
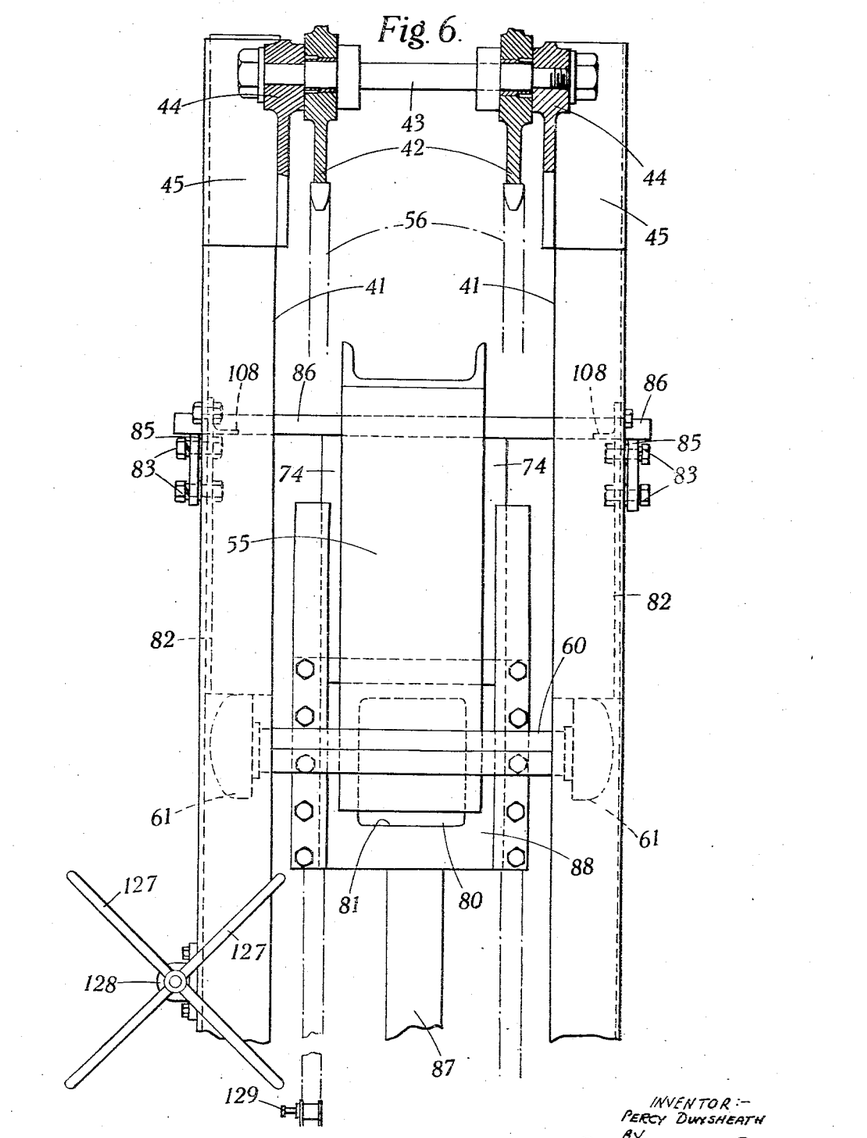
Figure 6 is an elevation, at right angles to that shown in Figure 5, of the upper end of the elevator and adjacent part of the furnace.

With the above described form of magazine it is preferred to employ an elevator 40 of endless chain type having a single ingot cradle which is alternately raised from a point of the magazine to a point adjacent the charging aperture of the furnace 65 and lowered again. An example of such an elevator is shown in the drawings and comprises a main frame consisting of two spaced channel members 41 arranged vertically with their flanges turned towards one another. A pair of chain wheels 42 are rotatably mounted on a spindle 43 mounted in supports 44 formed in brackets 45 on the upper ends of the channels 41 and a corresponding pair of chain wheels 46 are mounted near the lower end of the frame on a shaft 47 which is housed in bearings 48 formed in brackets 49 which are secured to the frame by bolts 50 passing through slots 51 in the flanges 52 of the bracket. This arrangement permits of adjustment of the distance between the two pairs of chain wheels, the adjustment being effected by slackening the bolts 50 and raising or lowering the brackets 49 by means of a screw jack 53 acting on the bridge piece 54. The ingot cradle is in the form of an inclined, open ended, channel shaped member 55 which is located between the two chains 56 and is supported from them by studs 57, projecting one from the upper end of each side wall of the channel and entering the adjacent chain which is of the hollow stud type, and by a pair of adjustable links 58, the upper ends of which are pivotally connected one to each chain at a point above the point at which the upper end of the cradle is connected, and the lower ends of which are pivotally connected to the cradle by studs 59 at a point between its upper and lower ends. Near its lower end the cradle carries a horizontal spindle 60 on each end of which is mounted a guide roller 61 which is housed within the adjacent one of the two channel members 41 constituting the elevator frame. The diameter of these rollers is slightly less than the width between the flanges of the channels and their outer end surfaces are rounded as shown in Figure 6. The channel members 41 thus serve as guides for the ingot cradle. By adjusting the length of the links 58 the angle at which the cradle is supported can be accurately adjusted whatever the tension in the chains 56.

Figure 1:
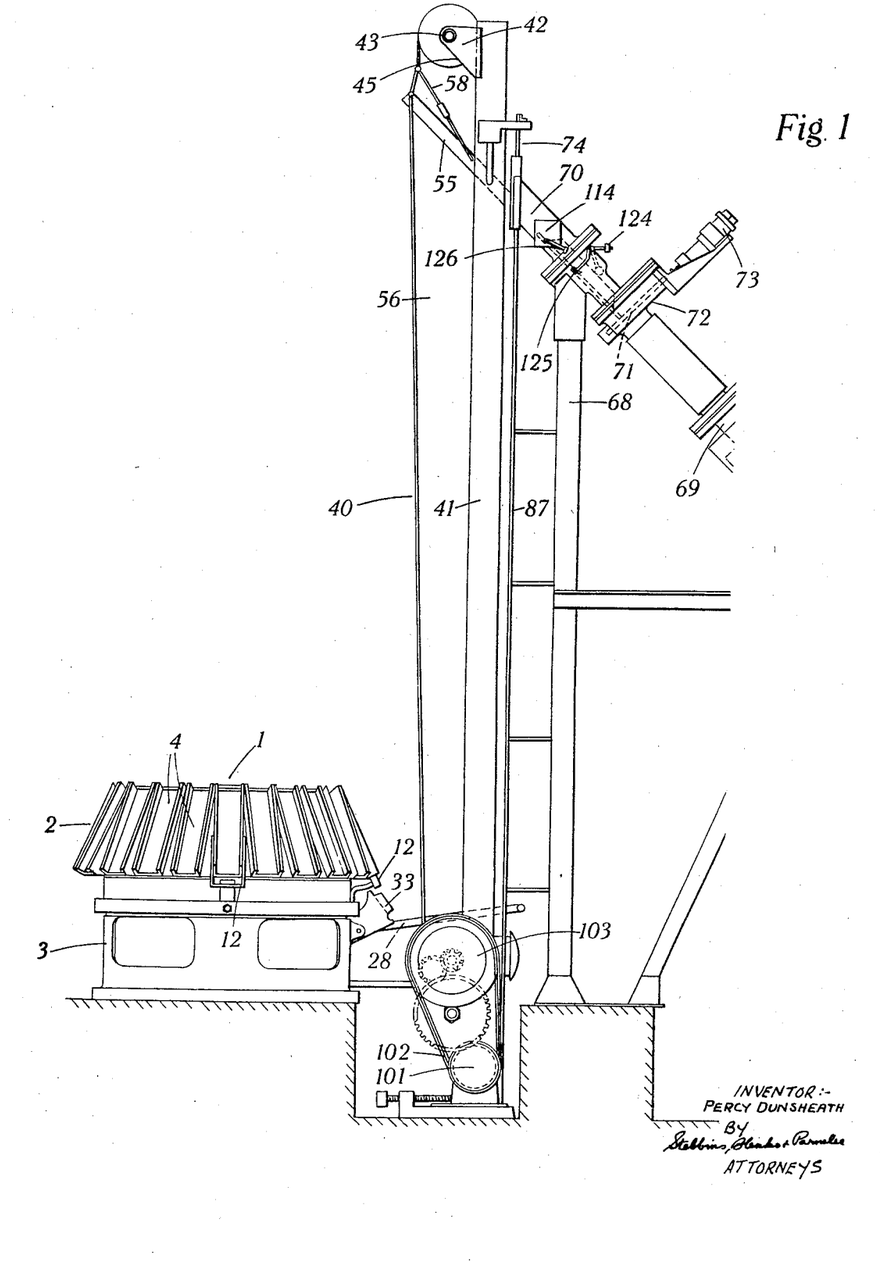
Figure 1A:
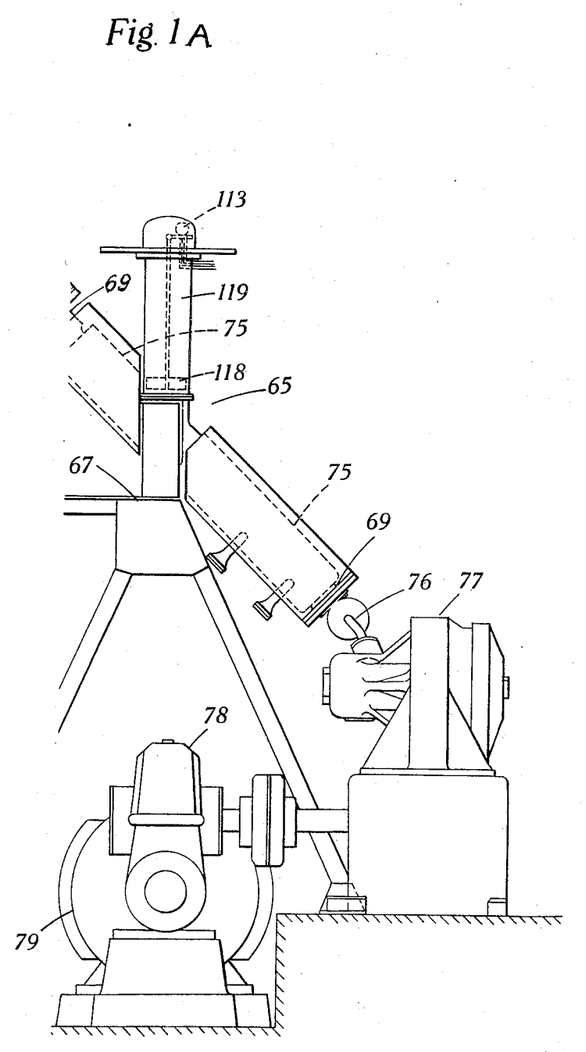
Figure 2:
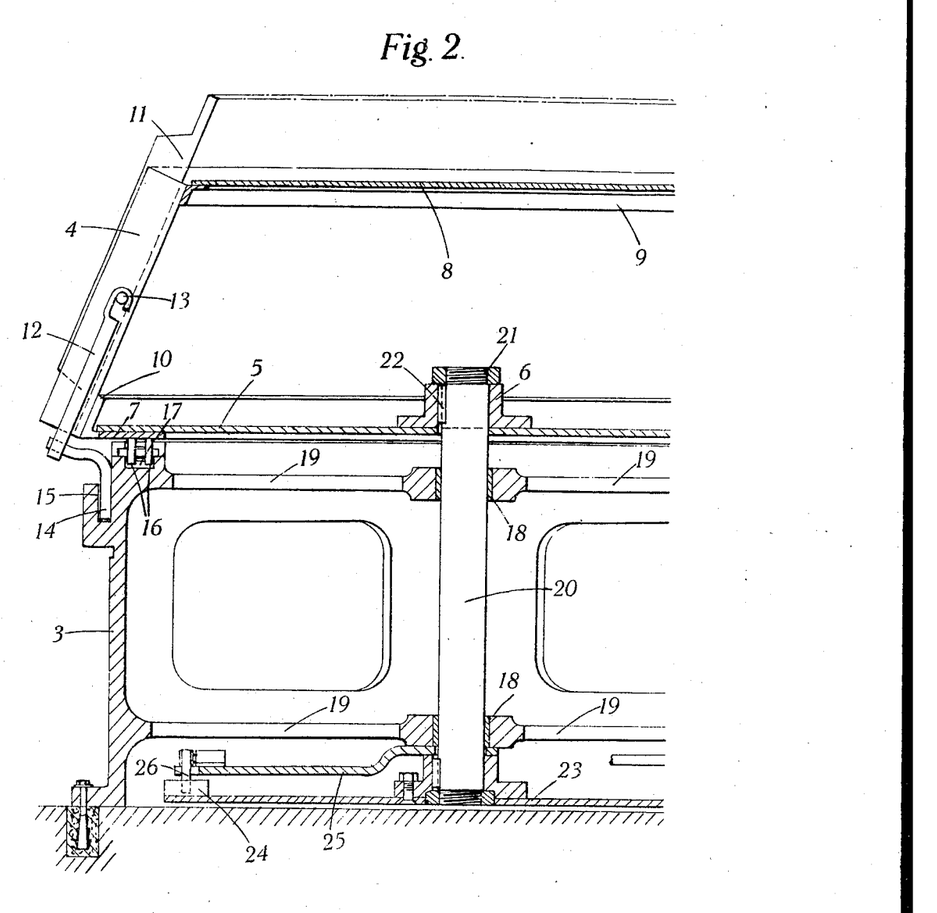
Figure 2A:
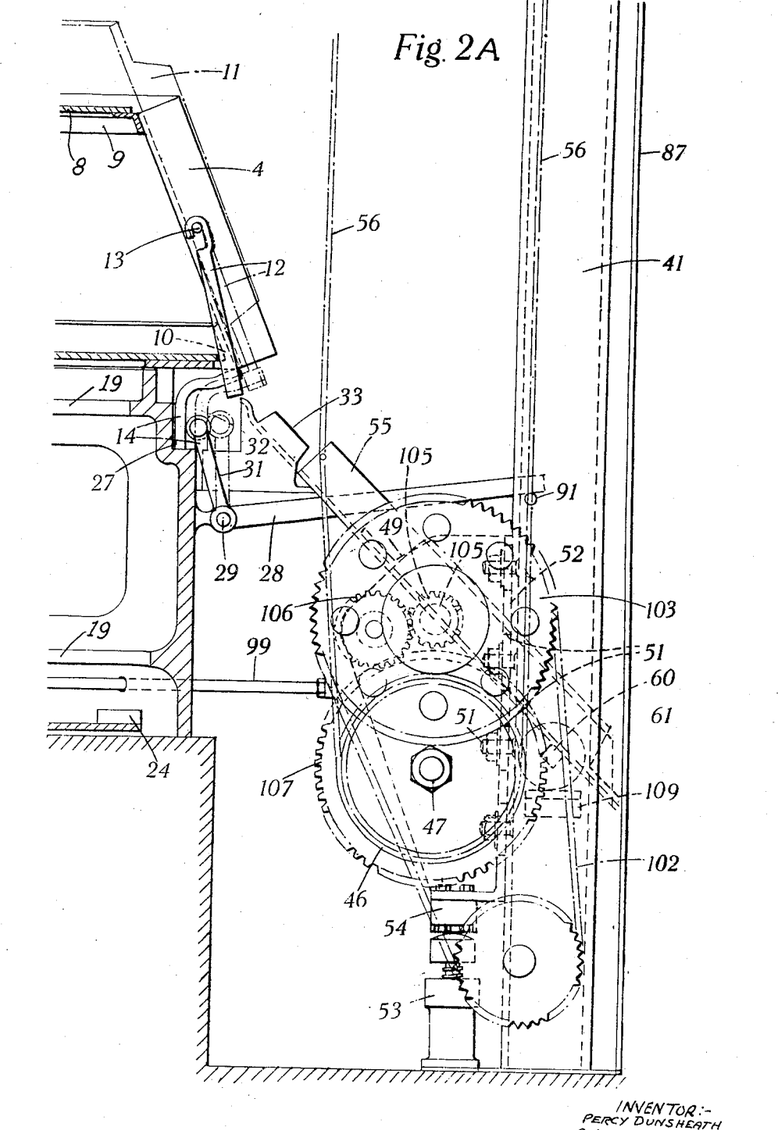

The furnace 65 shown in Figure 1A of the drawings comprises an inclined tubular structure mounted on supports 67 and 68. The lower and major portion of the tubular structure forms a melting chamber 69 and the upper part a gas lock chamber 70 which is normally shut off from the melting chamber by a sliding door 71 located within a housing 72 and operated by a compressed air engine 73 or other suitable device. The upper end of the lock chamber 70 is normally closed by a vertically disposed sliding door 74. Ingots are fed into the lock chamber, one at a time, and when the door 71 is opened slide into the lower end of melting chamber where they are melted by heat supplied by a muff heater 75. Molten metal is drawn off through the pipe 76 and led to the inlet end of a metal working or casting machine, such as the continuous extrusion machine 77 which is driven through gearing 78 by a motor 79.

Figures 3, 7:
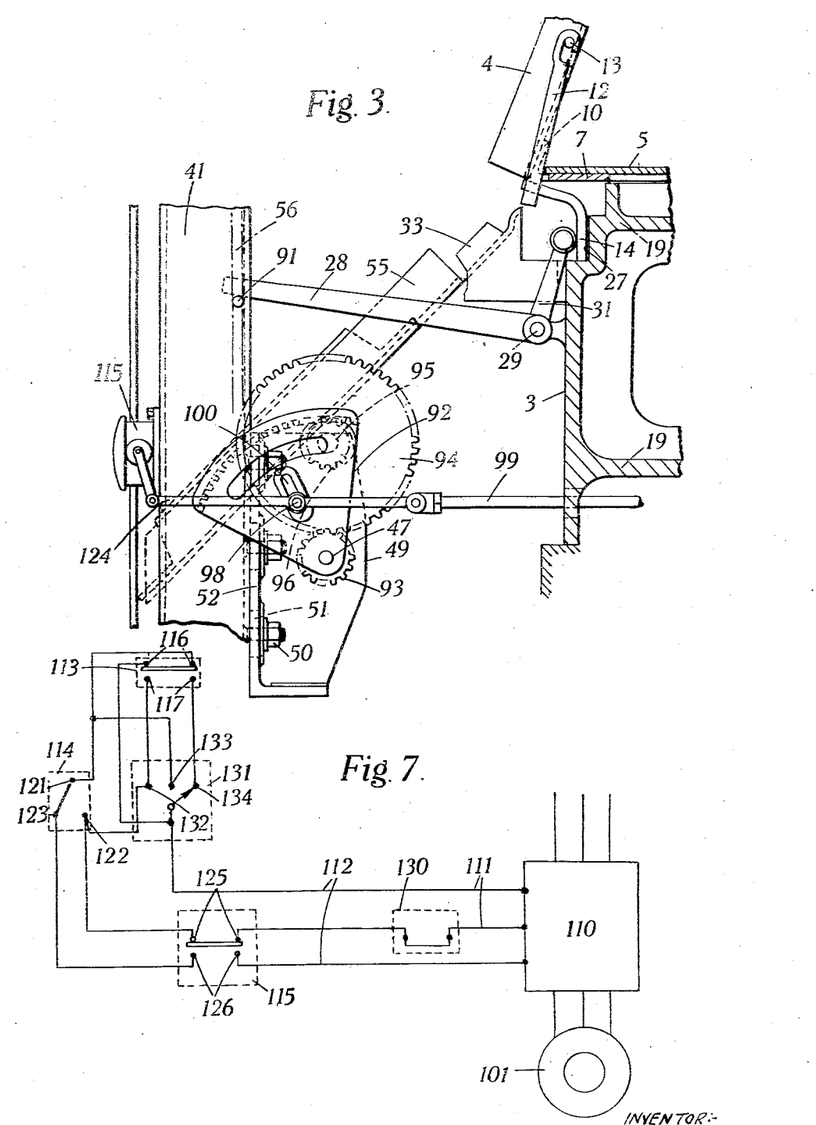
Figure 3 is a fragmental view of the opposite side of the magazine and lower end of the elevator.
Figure 7 is a circuit diagram illustrating the preferred system of controlling the operation of the improved ingot feeding apparatus.
Figure 5:
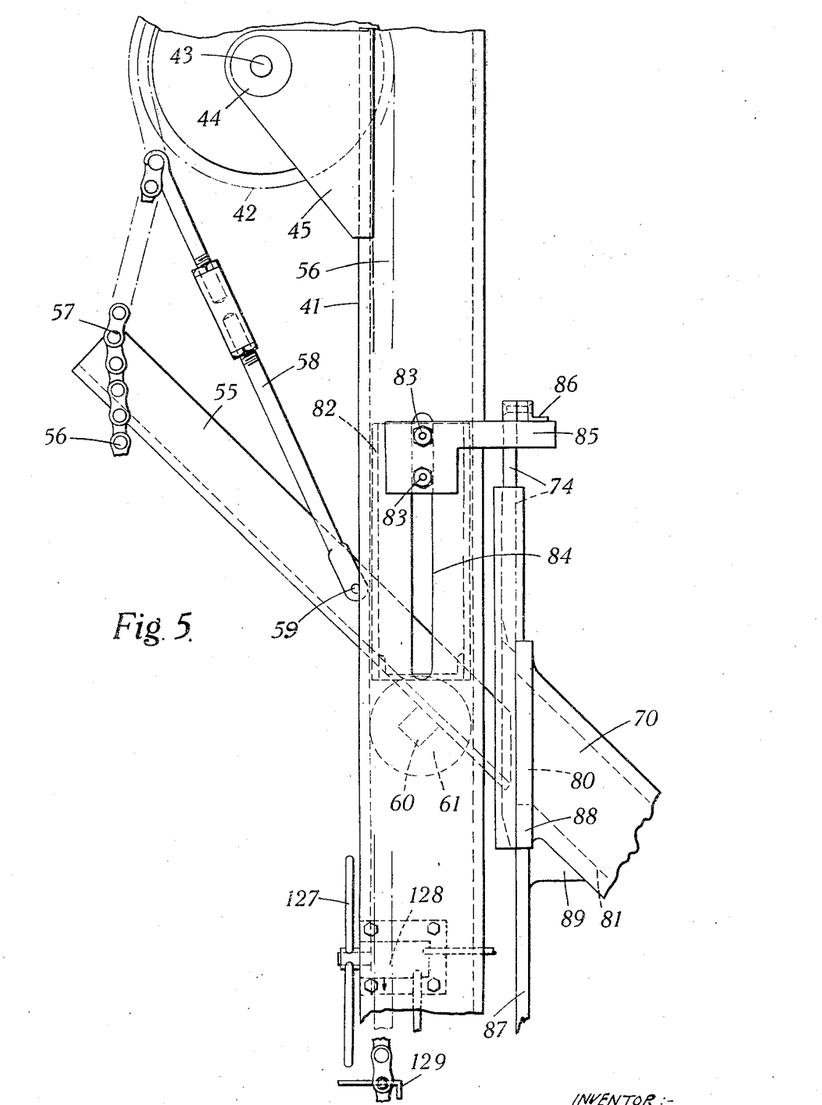
Figure 5 is a side elevation of the upper end of the elevator and adjacent part of the melting furnace.

The magazine, elevator and furnace are relatively disposed, as is clearly shown in the drawings, in such a manner that, when the elevator cradle 55 is at the bottom of its travel its upper end is, as shown in Figure 3, adjacent the lower edge of the channel shaped guide 33 below the carrier of the magazine that is in the releasing position and, when the cradle is at the top of its travel, its lower end is, as shown in Figure 5, adjacent the lower edge of the charging aperture 80 of the furnace and forms an extension of the inclined bottom wall 81 of the lock chamber. The outer sliding door 74 of the furnace is operated by the movement of the cradle 55 in the manner described in the following sentences. In the upper end of each channel member 41 forming the elevator frame is housed a channel shaped member 82 having an external section corresponding to the internal section of the channel 41. This member 82 is secured to the frame channel 41 by bolts 83 which pass through a vertical slot 84 in the web of the latter member and holes in the web of the former in a manner which permits the member 82 to slide up and down in the channel 41 to a limited extent. To each slidable member 82 is secured, also by the bolts 83, a horizontally projecting arm 85. As the cradle nears the end of its upward travel, its guide rollers 61 strike the sliding members 82 and lift them, bringing the arms 85 into engagement with the ends of a horizontal bar 86, to the central part of which is secured the upper end of the sliding door 74 and then lifting the bar and so opening the door 74. During the upward movement of the cradle the ingot is retained therein by means of a vertical guide strip 87 which to ensure that its upper end is always flush with the face of the flange 88 surrounding the charging aperture 80, is anchored at that end to a bracket 89 on wall of the lock chamber. As soon as the lower edge of the ingot in the cradle clears the bottom edge of the charging aperture, that is when the cradle has reached the limit of its travel, the ingot slides off into the lock chamber 70. As the cradle descends the sliding members 82 fall and allow the door 74 to fall and close the charging aperture once more.

The transfer of an ingot from the magazine to the elevator is preferably effected automatically at the end of the downward movement of the cradle. For this purpose a projection 91 (Figures 3 and 4) is provided on the ascending portion of one of the elevator chains 56, which engages the end of the lever 28 and lifts it, thus swinging inwards the stirrup of the carrier opposite the cradle so as to release the ingot just as the cradle reaches the bottom. When the cradle ascends the lever returns to its normal position under the influence of gravity.

The magazine drum is preferably driven by the elevator, rotation through the appropriate angle taking place during the upward movement of the conveyor cradle. This is effected by means of an internally toothed quadrant 92 loosely mounted on the projecting end of the lower chain wheel shaft 47 and driven by that shaft through a double reduction gearing comprising a pinion 93 keyed on the shaft 47, a spur wheel 94 engaging therewith and mounted on a stub shaft 95 projecting from the bracket 49, and a second pinion 96, also mounted on the stud shaft 95 and driven by the wheel 94, which engages the teeth of the quadrant. The gear ratio is such that the quadrant is driven through an angle of about 60° during the upward movement of the elevator cradle and returned to its initial position during the downward movement of the cradle. The quadrant carries a pin 98 serving as a crank pin to which is coupled the end of a connecting rod 97 pivotally connected by a reciprocating rod 99 to the arm 25 carrying the pawl of the magazine ratchet gear. To permit the length of stroke of the rod 99 to be adjusted to suit the pitch of the projections 24 forming the teeth of the ratchet wheel the crank pin is adjustable in the radially extending slot 100 in the quadrant.

The elevator is preferably driven by a reversible motor 101 (Figure 1) which drives through a chain 102 a chain wheel 103 in which a torque limiting device such as a friction clutch is incorporated. This chain wheel 103 is rotatably mounted on a stub shaft 104 projecting from the bracket 49 and drives a pinion 105 which is also mounted on the same stub shaft. The pinion 105 drives through an idler wheel 106 a spur wheel 107 keyed on the elevator chain wheel shaft 47. Overrunning of the elevator in the ascending direction is prevented by the provision of stops 108 which limit the upward movement of the sliding members 82 and hence of the guide rollers 61, and overrunning in the descending direction is prevented by stops 109 which directly engage the guide rollers. Damage to the motor or elevator is prevented by the friction coupling embodied in the chain wheel 103.

The magazine and elevator may be operated at the will of an attendant or automatically at predetermined intervals of time, for instance, by arranging for the motor 101 to continue to run alternatively in reverse directions without any substantial interval of rest. In this case the reversal can be effected by a reversing switch actuated by the elevator at the end of its travel in either direction and the rate of charging can be adjusted by varying the running speed of the motor or by means of a change speed gear in the drive from the motor. Preferably however the operation of the charging apparatus is controlled by the level of molten metal in the furnace. To this end the driving motor is controlled by a reversing auto-starter 110 (Figure 7) comprising a pair of remote controlled electro-magnetic contactors, closing of one of which starts the motor running in one direction and closing of the other of which starts the motor running in the reverse direction. The starter is controlled by the level of molten metal in the furnace in the manner shown in Figure 7. Closing of the contactor causing the motor to start in a direction which causes the elevator cradle to rise is effected by completion of a circuit 111, termed the 'up' control circuit, and closing of the contactor causing the motor to start in a direction which results in descent of the elevator cradle is effected by completion of a second circuit 112, termed the 'down' control circuit. In conjunction with these two circuits 111, 112 are employed a level switch 113, a control switch 114 and a limit switch 115, inserted as shown in the circuit diagram. The level switch 113 is a change over switch comprising two pairs of contacts, 116 and 117, one pair in each circuit. When the level is high the pair 116 in the 'down' circuit are bridged and the pair 117 in the 'up' circuit are disconnected. When the level falls the pair 116 in the 'down' circuit are opened and the pair 117 in the 'up' circuit are bridged. The switch 113 is preferably a mercury switch actuated by the rise and fall of a float 118 working in a float chamber 119 in communication with the melting chamber 69. The control switch 114 is also a change-over switch comprising three contacts 121, 122 and 123. This switch is actuated by the movement of an ingot into or out of the gas lock chamber 70. This is effected by means of a pivoted arm 124 located in the chamber and bearing on the ingot normally present therein. The arm 124 is coupled to the arm 125 on the outside of the chamber. When the arm 124 falls it lifts the arm 125 which, in turn, raises the arm 126 on the switch and actuates the switch. When an ingot is introduced into the chamber the switch resumes its initial position. When the chamber 70 is devoid of an ingot the switch 114 bridges contacts 121 and 122 and opens the 'down' circuit. When there is an ingot in the chamber it connects the contacts 121 and 123 and, provided the level switch is in the 'high' position, opens the 'up' circuit. The limit switch 115 is mounted on the lower end of the elevator frame and is actuated by movement of the elevator, being driven by coupling it to the quadrant 92 by an auxiliary connecting rod 124. This switch operates to bridge a pair of contacts 125 in the 'up' circuit and opens a pair of contacts 126 in the 'down' circuit when the elevator cradle is at the bottom of its travel and to open the 'up' circuit and bridge the contacts in the 'down' circuit when the elevator is at the top of its travel.

The automatic operation of the elevator will be understood by considering the sequence of operations, commencing from an initial condition, as indicated in Figure 7, in which the level of molten metal is high, an ingot is present in the feed chamber and the elevator cradle is charged with an ingot and at the bottom of its travel, the carrier of the magazine opposite the cradle being empty. When the level of molten metal falls to a predetermined extent the level switch 113 is actuated causing contacts 116 to be opened and contacts 117 to be bridged. This completes the 'up' control circuit and the motor starts up the elevator in the direction to cause the cradle to rise. After it has ascended a little way a trigger 129 on the descending side of one of the elevator chains strikes one of a number of arms 127 projecting from the spindle of a valve 128 mounted on the upper part of the elevator frame and causes the valve, which controls the admission of fluid under pressure to the door engine 73, to open to admit fluid to the engine which then opens the door 71 between the lock and melting chambers. The ingot in the lock chamber is thus released and slides down into the melting chamber. As the ingot leaves the lock chamber the control switch 114 is actuated so as to bridge contacts 121 and 122 and as the ingot becomes immersed in the molten metal in the melting chamber it raises the level, under normal conditions of working, sufficiently to reset the level switch, thus maintaining the continuity of the 'up' circuit. The elevator continues to ascend and a second trigger on the descending side of one of the elevator chains strikes a second arm of the valve 128 and moves it into a position which causes the engine to release the door. The elevator cradle continues its ascent and opens the outer door 74 of the lock chamber in the manner previously described. As it reaches the top of its travel the limit switch 115 is actuated, disconnecting contact 125 and bridging contact 126, and the cradle discharges its ingot into the chamber. As the ingot passes into the chamber it actuates the control switch 114 which bridges contacts 121 and 123. This completes the 'down' circuit causing the elevator motor to start in the reverse direction and the cradle to descend. It will be remembered that during the ascent of the cradle the magazine is rotated to bring a full carrier opposite the elevator and as the cradle reaches the bottom, the ingot is released from that carrier and slides into the cradle. Simultaneously the limit switch is again actuated thus interrupting the 'down' circuit. The elevator then remains at rest until the level again falls.

In Figure 7 will be seen a fourth switch 130 in the lead of the 'up' circuit. The function of this switch is to prevent the starting of the motor in a direction to raise the elevator cradle if there is insufficient fluid pressure to operate the door engine 73, and thus prevent damage due to the incomplete discharge of an ingot from the elevator cradle. A further switch 131 may also be provided for the purpose of operating the elevator in either direction by hand. This switch is a three-way change over switch, when the switch is set to contact 132 the elevator will rise, if not already at the top; if set to contact 133 the elevator will, if not already at the bottom, descend. If the switch is set to contact 134 the elevator is controlled automatically in the manner described. The hand operating switch will generally be used to operate the charging apparatus under abnormal conditions, for instance, for the initial charging of the furnace.

Where the improved feeding apparatus is applied to a melting furnace of the kind described in the specification of patent application Serial No. 82,539, now Patent No. 2,122,233, to control the rate of feeding by the rate at which ingots are melted, the level switch 113 may be omitted and the control switch be actuated by movement of an ingot in the upper end of the melting chamber. In cases where no lock chamber is provided the level switch can be used and the control switch 114 be omitted.

What I claim as my invention is:

1. Apparatus for feeding ingots to a metal melting furnace, comprising a frame, a drum supported on said frame and rotatable about its vertically disposed axis, a plurality of inclined channel members, each forming a carrier for an ingot, disposed uniformly around the periphery of said drum, a stirrup on each channel member pivotally secured at its upper end to the said member, an extension piece provided on each stirrup and engaging a guide channel extending round the peripheral wall of the said frame thereby normally to retain the stirrup in a position to engage the lower end of an ingot in the inclined channel member, means for rotating the said drum step by step to bring said channel members successively to a release position where the inner surface of the guide channel is recessed, an elevator for receiving ingots discharged from said channel members and transferring them to the furnace, and means, automatically controlled by movement of said elevator, for displacing the stirrup of a channel member in the release position inwardly to an extent sufficient to release an ingot and permit it to be discharged on to said elevator.

2. Apparatus for feeding ingots to a metal melting furnace, comprising a vertical drum shaft and supports therefor, a drum mounted on said drum shaft, a plurality of ingot carriers disposed uniformly around the periphery of said drum, a disc also mounted on said drum shaft, a number of projections, corresponding to the number of said carriers, uniformly distributed around the periphery of said disc, an arm rotatably mounted on said drum shaft, a pawl carried on said arm, and means for reciprocating said arm through a limited angle thereby causing said pawl to rotate said drum and bring the said carriers successively into a position in which ingots can be released therefrom, and an elevator for receiving ingots discharged from said ingot carriers and transferring them to the furnace, said reciprocating means comprising a crank driven by movement of said elevator and means for connecting said crank to said arm.

3. Apparatus for feeding ingots to a metal melting furnace, comprising in combination, a magazine in the form of a rotatable drum which has uniformly disposed around its periphery a number of ingot carriers, an endless chain elevator having a single rising and falling ingot cradle adapted to receive an ingot from the magazine and transfer it to the furnace, means associating said magazine with said elevator whereby the upward movement of the cradle causes the magazine to rotate through an angle equal to the angular pitch of the carriers thereon to bring a loaded carrier into a discharge position, and a device, actuated by the downward movement of the cradle, for releasing the ingot from the carrier in the discharge position and allowing it to discharge into the cradle as the cradle reaches the bottom of its travel.

4. Apparatus for feeding ingots to a metal melting furnace comprising an ingot magazine and an elevator for transferring ingots discharged from said magazine to the furnace, said magazine comprising a vertical drum shaft, a drum mounted on said drum shaft, a plurality of ingot carriers disposed uniformly around the periphery of said drum, a disc also mounted on said drum shaft, a number of projections, corresponding to the number of said carriers, uniformly distributed around the periphery of said disc, an arm rotatably mounted on said drum shaft, a pawl carried on said arm, a crank driven by said elevator, for reciprocating said arm through a limited angle thereby causing said pawl to engage said projections and rotate said drum and bring each of said carriers in succession into a position in which an ingot therein is discharged therefrom on to said elevator.

5. Apparatus for feeding ingots to a metal melting furnace, comprising a drum rotatable about its vertically disposed axis, a number of ingot carriers disposed uniformly around the periphery of said drum, means for retaining an ingot on each of said carriers, means for rotating said drum step by step to bring said carriers successively into a discharge position, an elevator for receiving ingots discharged from said carriers and transferring them to the furnace, and means automatically controlled by movement of said elevator, for releasing the retaining means on the carrier in the discharge position.

6. Apparatus for feeding ingots to a metal melting furnace, comprising a drum rotatable about its vertically disposed axis, a number of ingot carriers disposed uniformly around the periphery of said drum, an elevator having a single rising and falling cradle adapted to receive an ingot from a carrier in a discharge position and transfer it to the furnace, means comprising a ratchet gear for coupling said elevator with said drum, whereby movement of the elevator cradle in one direction is accompanied by a rotation of said drum through one carrier pitch to bring a loaded carrier into a discharge position, and means controlled by the position of the cradle, for releasing an ingot from the carrier in the discharge position and allowing it to discharge into the cradle.

7. Apparatus for feeding ingots to a metal melting furnace, comprising a drum rotatable about a vertical axis, a plurality of open ended inclined channel members arranged side by side around the periphery of said drum, means located at the lower end of each channel member for retaining ingots therein, means for rotating said drum step by step to bring each channel member in succession into a discharge position, an elevator for receiving ingots discharged from said channel members and transferring them to the furnace and means, automatically controlled by movement of said elevator, for withdrawing said retaining means of the channel in the discharge position, thereby to release an ingot and permit it to be discharged on to said elevator.

8. Apparatus for feeding ingots to a metal melting furnace, comprising a drum rotatable about a vertical axis, a plurality of inclined channel members, each forming a carrier for an ingot, disposed uniformly around the periphery of said drum, a stirrup on each channel member pivotally secured at its upper end to the said member and normally in a position to engage the lower end of an ingot in said member, means for rotating said drum step by step to bring each of said channel members in succession into a release position, an elevator for receiving ingots discharged from said channel members and transferring them to the furnace, and means automatically controlled by movement of said elevator, for displacing the stirrup of the channel member in the release position and permitting the ingot thereon to be discharged therefrom on to the said elevator.

9. In apparatus comprising a rotary magazine and an elevator associated therewith for feeding ingots released from the magazine to a metal melting furnace, a frame, a drum supported on said frame and rotatable about its vertical axis, a plurality of inclined channel members, each forming a carrier for an ingot, disposed uniformly around the periphery of said drum, a stirrup on each channel member pivotally secured at its upper end to the said member, an extension piece provided on each stirrup and engaging a guide channel extending round the peripheral wall of the said frame, thereby normally to retain the stirrup in position to engage the lower end of an ingot in the channel member, means for rotating said drum step by step to bring each of said channel members in succession into a release position where the inner surface of the guide channel is recessed, means for displacing the stirrup of the channel member in the release position inwardly to an extent sufficient to release an ingot, an elevator for receiving ingots released from said channel members and transferring them to the furnace, and means for coordinating movement of said elevator and movement of said drum.

10. In apparatus as specified in claim 9, a cam-shaped surface on the wall of said frame for returning each inwardly displaced stirrup as the channel member to which it is secured moves away from the release position.

11. Apparatus for feeding ingots through a lock chamber to the melting chamber of a metal melting furnace, comprising in combination, a magazine in the form of a rotatable drum which has uniformly disposed around its periphery a number of ingot carriers, an endless chain elevator having a single rising and falling ingot cradle adapted to receive an ingot from the magazine and transfer it to the furnace, means, automatically controlled by a predetermined fall from the normal level of molten metal in the furnace, for starting said elevator in a direction to cause the cradle to rise, means for stopping said elevator automatically when the cradle has reached the top of its travel, means controlled by the transfer of an ingot from the cradle to the furnace for starting said elevator in the reverse direction, and means associating said magazine with said elevator whereby movement of the cradle in one direction is accompanied by a rotation of said magazine through one carrier pitch to bring a loaded carrier into a discharge position, and a device controlled by the position of the cradle for releasing the ingot from the carrier in the discharge position and allowing it to discharge into the cradle, and means for stopping the said elevator automatically when the cradle has reached the bottom of its travel.

12. Apparatus for feeding ingots through a lock chamber to the melting chamber of a metal melting furnace, comprising in combination, a magazine in the form of a rotatable drum which has uniformly disposed around its periphery a number of ingot carriers, an endless chain elevator having a single rising and falling ingot cradle adapted to receive an ingot from the magazine and transfer it to the furnace, means associating said magazine with said elevator whereby movement of the cradle in one direction is accompanied by a rotation of said magazine through one carrier pitch to bring a loaded carrier into a discharge position, a device controlled by the position of said cradle for releasing the ingot from the carrier in the discharge position and allowing it to discharge into the cradle, means, actuated by an initial portion of the upward movement of the loaded cradle, for opening a door between the lock chamber and the melting chamber and, actuated by a subsequent portion of the upward movement of the cradle, for closing the said door again, and means actuated by a final portion of the upward movement of the cradle for opening an outer door of the lock chamber.

13. Apparatus for feeding ingots through a lock chamber to the melting chamber of a metal melting furnace, comprising in combination, a magazine in the form of a rotatable drum which has uniformly disposed around its periphery a number of ingot carriers, an endless chain elevator having a single rising and falling ingot cradle adapted to receive an ingot from the magazine and transfer it to the furnace, means for coupling said elevator to said magazine whereby movement of the cradle in an upward direction is accompanied by a rotation of said magazine through one carrier pitch to bring a loaded carrier into a discharge position, a device controlled by the position of the cardle for releasing an ingot from the carrier in the discharge position and allowing it to discharge into the cradle, a reversible electric motor for driving said magazine and elevator, a reversing auto-starter controlling the operation of said motor, a pair of control circuits comprising an 'up' circuit and a 'down' circuit, control switches comprising a change-over level switch actuated by a change in the level of molten metal in the melting chamber, a change-over control switch actuated by movement of an ingot into and out of the lock chamber and a change-over limit switch controlled by the position of the cradle, associated with said control circuits, means, actuated by an initial portion of the upward movement of the loaded cradle, for opening a door between the lock chamber and the melting chamber and, actuated by a subsequent portion of the upward movement of the cradle, for closing the said door again, and means actuated by a final portion of the upward movement of the cradle for opening an outer door of the lock chamber, said switches being so arranged in said control circuits that a fall in the level of molten metal causes the level switch to close the 'up' circuit and thus start the motor in a direction to cause the cradle to rise, the transfer of an ingot from the lock chamber to the melting chamber re-sets the level switch and operates the control switch in a direction to cause the continuity of the 'up' circuit to be maintained until the cradle reaches the top of its travel and causes the limit switch to operate and disconnect the 'up' circuit from, and connect the 'down' circuit to, the starter, so stopping the motor, and the transfer of the ingot from the cradle into the lock chamber operates the control switch in a direction to close the 'down' circuit and thus cause the motor to run in the reverse direction until the cradle reaches the bottom of its travel and causes the limit switch to disconnect the 'down' circuit and connect the 'up' circuit to the starter, thus stopping the motor until a further fall in the level occurs.

PERCY DUNSHEATH.